United States Patent [19]

Imam et al.

[11] 4,380,172
[45] Apr. 19, 1983

[54] ON-LINE ROTOR CRACK DETECTION

[75] Inventors: Imdad Imam, Schenectady; Leslie H. Bernd, Altamont, both of N.Y.

[73] Assignee: General Electric Company, Schenectady, N.Y.

[21] Appl. No.: 236,007

[22] Filed: Feb. 19, 1981

[51] Int. Cl.³ .................... G01H 1/00; G01N 29/00
[52] U.S. Cl. .................................. 73/659; 73/587; 73/660
[58] Field of Search ............... 73/577, 587, 659, 660

[56] References Cited

U.S. PATENT DOCUMENTS

| | | | |
|---|---|---|---|
| 3,292,425 | 12/1966 | Conn | 73/660 |
| 3,315,522 | 4/1967 | Frarey et al. | 73/660 |
| 3,705,516 | 12/1972 | Reis | 73/660 |
| 4,184,205 | 1/1980 | Morrow | 364/508 |
| 4,213,346 | 7/1980 | Polovnikov et al. | 73/660 |
| 4,229,796 | 10/1980 | Garrett | 364/507 |
| 4,274,288 | 6/1981 | Tittmann et al. | 73/602 |
| 4,283,956 | 8/1981 | Lechner et al. | 73/799 |

OTHER PUBLICATIONS

"The Vibrational Behavior of a Turbine Rotor Containing a Transverse Crack", Grabowski, *Transactions of the ASME*, vol. 102, pp. 140–146.
"Vibrational Behavior of a Rotating System Containing a Transverse Crack", Mayes et al, 1976, paper No. C168/76, Conference on Vibrations in Rotating Machinery, I. Mech. E., Sep. 15-17, 1976.
"Dynamic Behavior of a Simple Rotor with a Cross--Sectional Crack", Gasch, 1976, paper No. C178-76, Conference as above.
"Vibrations in Cracked Shafts", Henry et al, paper No. 162/76, 1976, Conference as above.
*Computerized Signal Processing for Detecting Cracks under Installed Fasteners*–J. Couchman, J. Bell and P. Noronha.
*Crack Propagation Testing Machine Using Shimadzu Servopulser Dynatec*–Fujimoto et al., Shimadzu Corporation, Japan.

*Primary Examiner*—Howard A. Birmiel
*Attorney, Agent, or Firm*—Robert C. Kain, Jr.; John F. Ahern

[57] ABSTRACT

A method is disclosed by which incipient cracks are detected in the rotor of a fluid powered turbine while the turbine is on-line and running under substantially normal load. In a preferred form of the invention, vibrations are monitored in the rotor and signature analysis of the normal background vibration pattern is obtained to establish the spectral content of the normal vibration signal. The turbine rotor is then transitorily perturbed, preferably by changing the temperature of the motive fluid (steam temperature is changed for example in a steam driven turbine), and the signature analysis is again performed to determine changes in the vibration pattern. An increase in the amplitude of the fundamental frequency and the appearance and increase in amplitude of higher harmonics following rotor perturbation is indicative of the presence and size of a crack in the rotor.

11 Claims, 5 Drawing Figures

ON-LINE ROTOR CRACK DETECTION

BACKGROUND OF THE INVENTION

This invention relates generally to the detection of cracks in the rotor of a fluid powered turbine and in particular to a new method for the detection of incipient rotor cracks while the turbine is on-line under normal load.

The rotor of a turbine (for example, the rotor of a large steam turbine of the type used in the commercial generation of electrical power) is subjected to frequent severe stress due to any number of fairly routine turbine operating conditions. Included among these are such things as changes in load and operating temperature. Although rotor forgings are designed to withstand these stressful conditions, and while they have an excellent record of safety and reliability, cracks are known to develop under some circumstances in some rotors following years of service. The development and growth of a crack is by no means predictable, however, and in some extreme cases steam turbine rotors have actually burst in a brittle fracture mode.

Obviously, a cracked rotor must be replaced or repaired to protect equipment and personnel and to ensure continued efficient operation. If a crack is discovered soon enough, while it is small, the rotor may be economically repaired and returned to service in a relatively short time. On the other hand, if the crack has grown to the point that the rotor must be replaced, there is not only the high cost of replacement but even greater cost resulting from the loss of power generating capacity. Thus, there has been a nearly constant search in the art for improved methods and apparatus by which an incipient crack can readily be detected in a turbine rotor so that corrective action can be quickly taken.

A number of techniques are presently known and used to detect the presence and growth of a rotor crack. These include (1) surface inspection methods such as magnetic particle testing, eddy current testing, and dye penetrant techniques; and (2) volumetric methods such as ultrasonic testing (audiography). Unfortunately, none of these techniques is suitable for inspection while the machine is on line running under load. Operating personnel therefore try to ensure themselves against a major loss by scheduling periodic outages during which the turbine is inspected and tested by such techniques. While these periodic inspections provide an assessment of the condition of a rotor as it is at the time the investigation is performed, there is always the risk that a crack might initiate and grow between inspections. The technique of vibration signature analysis has also been used for rotor crack detection and has offered some relief from the need to bring the machine to a complete stop, but heretofore this technique has been useful only by taking the machine off line and then decelerating it to nearly zero speed to determine if a crack is present.

Accordingly, it is a general objective of the present invention to provide a rotor crack detection method which is useful for detecting rotor cracks while the turbine is on line operating under normal load and early enough to permit the rotor to be repaired without extensive down time.

Further objectives and advantages will be apparent from the ensuing description of the invention, its principles, and operation.

SUMMARY OF THE INVENTION

According to the invention, to detect incipient cracks in the rotor of a fluid powered turbine, very small cracks are made to be active and to manifest themselves as larger cracks (which are normally open during parts of each revolution of the rotor) during a period following a transient perturbation of the rotor. In essence, a perturbation is used to produce a new and different vibration response mode. In a preferred form of the invention, signature analysis of the normal background vibration pattern is first obtained to establish the spectral content of the normal vibration signal. The turbine rotor is then transitorily perturbed, preferably by changing the temperature of the motive fluid (steam temperature is changed for example in a steam driven turbine), and the signature analysis is again performed to determine changes in the vibration pattern. In particular, the increase in amplitude of the fundamental frequency and the appearance and increase in amplitude of higher harmonics following rotor perturbation is indicative of the presence of a crack.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawing in which:

DETAILED DESCRIPTION OF THE INVENTION

The presence of a crack in the rotor of a fluid powered turbine (e.g., a large steam turbine) causes the bending stiffness of the rotor to vary with its instantaneous position. In addition, a crack introduces stiffness asymmetry in the vertical and horizontal directions. These effects produce vibration patterns in the turbine rotor which are different from the vibration patterns produced by a normally operating turbine having an uncracked rotor.

Figure 1:
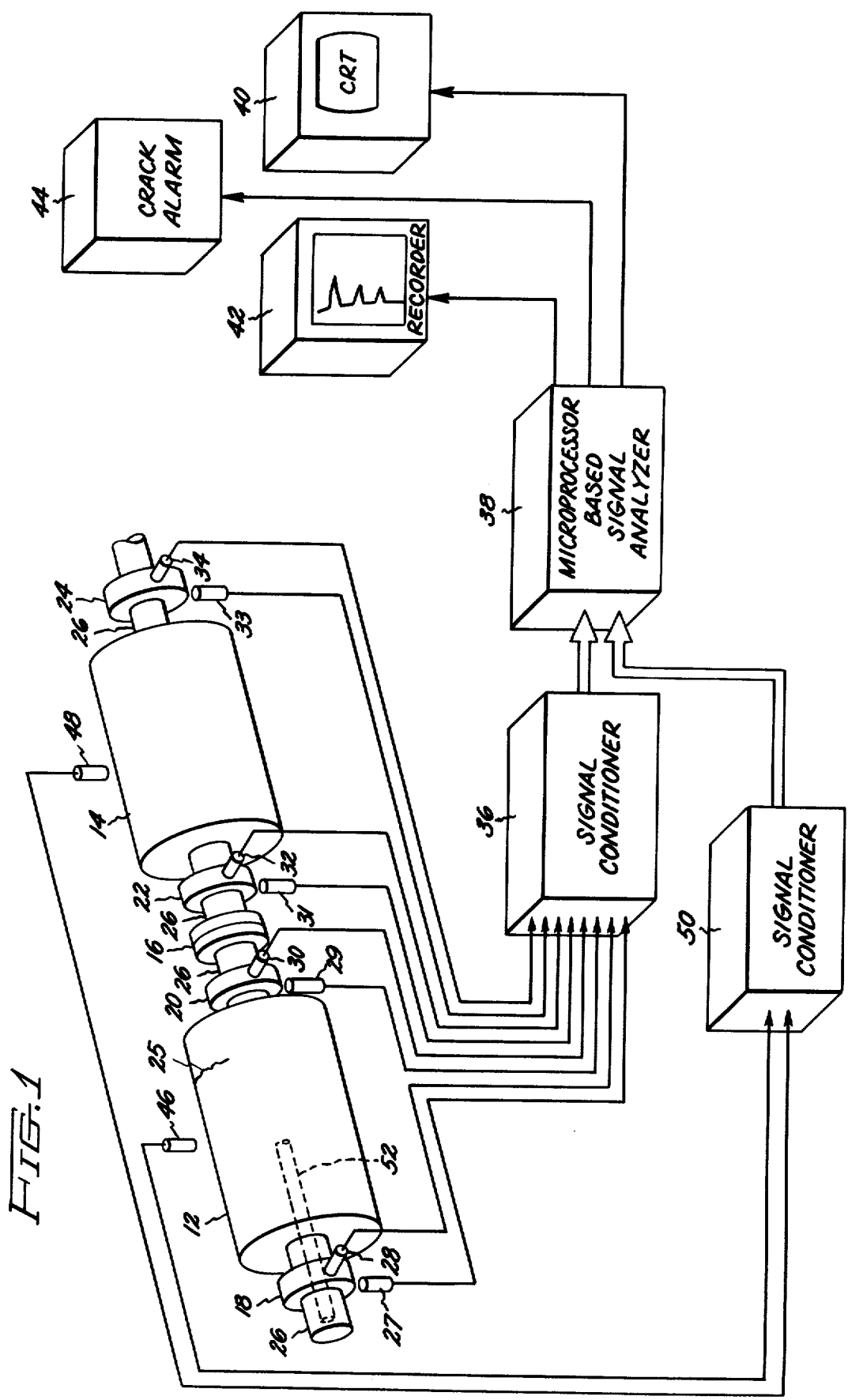
FIG. 1 is a simplified schematic illustration of a tandemly coupled turbine rotor and of apparatus for carrying out the invention.

FIG. 1 schematically illustrates a steam turbine rotor and one form of apparatus for producing and analyzing signals indicative of rotor vibrations according to the present invention. In FIG. 1, only those elements of a turbine essential to an understanding of the invention are shown. It will be recognized, for example, that the rotor 10 is encased within one or more outer shells and further includes a plurality of radially extending buckets or blades assembled in axially spaced rings which, with associated stationary nozzle rings, form the different turbine stages. Rotor 10, as illustrated, is comprised of two tandemly coupled rotor wheels, 12 and 14, which carry the turbine buckets as described above. The two wheels 12 and 14 are fastened together through coupling 16 and rotate as a unit while supported by journal bearings 18, 20, 22, and 24 and shaft 26. For explanation purposes, an illustrative crack 25 is included on the surface of rotor wheel 12.

Vibrations in the turbine rotor 10 are detected by vibration sensors 27–34, proximately located in pairs near each journal bearing 18, 20, 22, and 24. The sensors (for example, sensors 27 and 28) are positioned substantially 90° apart around the circumference of the bearing to discern the vertical and horizontal components of vibration. The vibration sensors 27–34, electrically connected to signal conditioner unit 36, provide electronic signals corresponding to the mechanical vibrations of rotor 10 and may, for example, be displacement or accelerometer type devices such as are well known in the art. The signal conditioning unit 36 provides excitation to the vibration sensors 27–34 and receives the various vibration signals from these devices while providing amplification and filtration of the received signals as necessary. The use of multiple sensors 27–34 as illustrated insures a sensitive response to small cracks and aids in determining their location.

The conditioned vibration signals are presented to a microprocessor-based signal analyzer 38 which processes the signals to obtain an analysis of the spectral content of each signal. The technique of spectrum analysis is well known in the signal processing field and is also often referred to as "signature analysis" or "Fourier analysis." Briefly described, the signature analysis separates a complex vibration signal into its harmonic constituent frequencies so that the signal can be presented in the frequency domain as opposed to the somewhat more conventional time domain presentation. The signal analyzer 38 is capable of handling each vibration signal separately, although with high-speed signal processing techniques currently available, each signal is analyzed essentially concurrently and on a virtual real-time basis. The signature analysis results are displayed on a cathode ray tube (CRT) readout 40 and may be provided in permanent, hard-copy format by graphic recorder 42. A crack alarm 44 (which may be an audio-visual device) is provided to announce the existence of a crack in the rotor 10 should the signature analysis process indicate that one has occurred.

Figure 2:
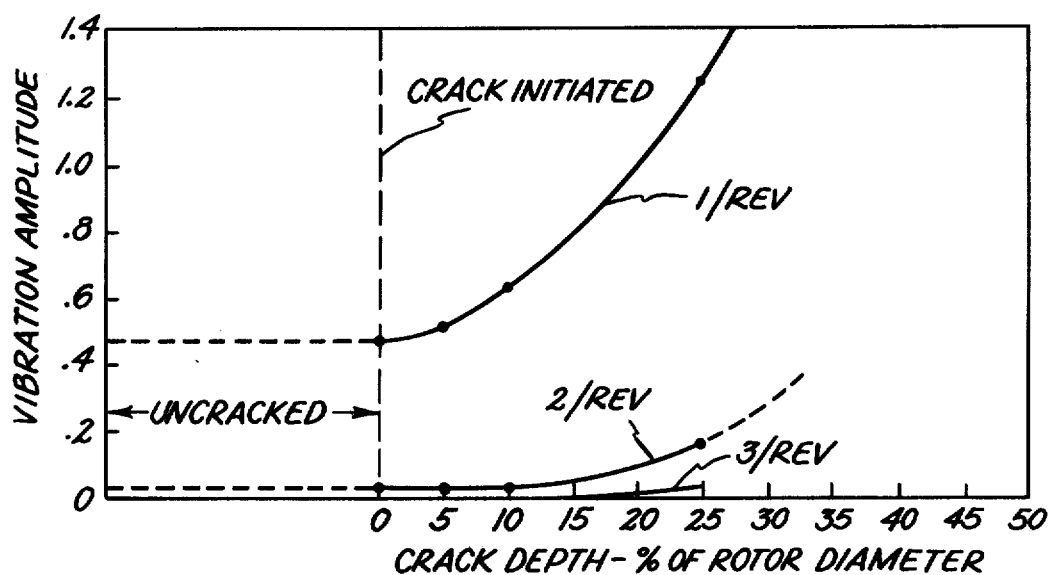
FIGS. 2 and 3 are plots of analytical data indicating the effect of a cracked rotor on a vibration signal depending upon crack behavior during rotation.
Figure 3:
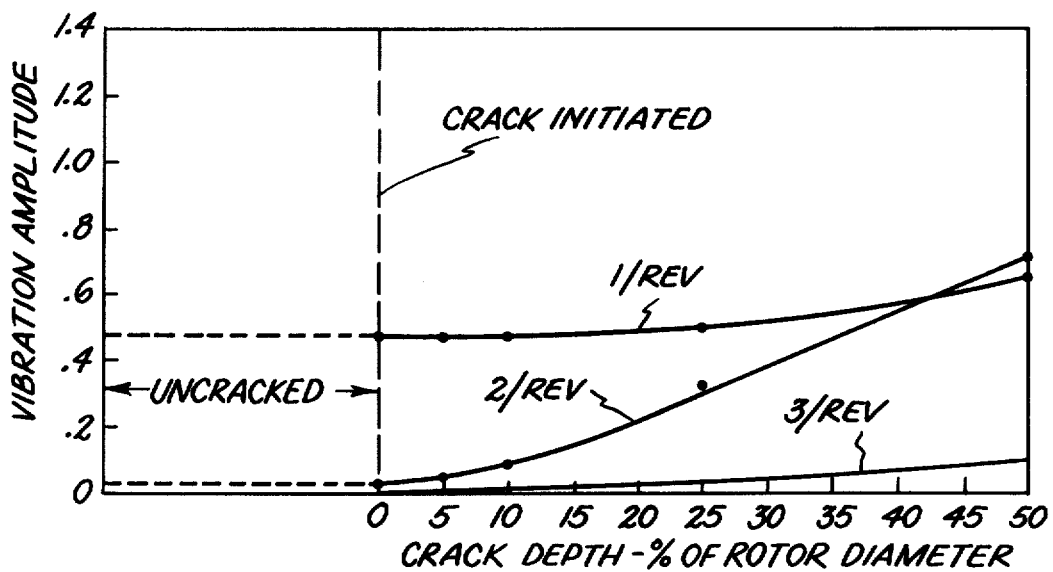

In the steady state condition, the most important indication of the presence of a crack is given by the initial appearance and/or a steady state increase in vibration signal components at the fundamental frequency of rotation and at higher harmonics thereof. These signal components may at times herein be referred to as 1/rev, 2/rev, 3/rev harmonics and so on. The appearance or increase in the 2/rev harmonic is especially important because it is the key indication of a transverse or circumferential crack extending partially around the rotor. Furthermore, for the case in which the crack tends to remain open all the time—applicable for circumferential or multiple symmetric cracks—the 1/rev response remains nearly unchanged until the crack depth propagates to a substantial depth. However, the 2/rev response begins to increase at the instant of crack initiation. For the case in which there are simple transverse cracks which open and close with revolution, both the 1/rev and the 2/rev harmonics increase steadily, although the 1/rev increase is predominant. FIG. 2 shows the analytical results for a case in which the crack opens and closes under the influence of rotor rotation; FIG. 3 shows similar results for the situation in which the crack remains open.

Thus, while the foregoing method is demonstrably useful for detecting cracks it is, as mentioned above, highly desirable that any incipient crack be detected at the earliest possible moment.

In many cases, the contribution from various harmonics to the vibration signal is relatively small at normal speed in a steady state condition and the unbalance effects are predominant so that any existing crack is either kept closed or is only opened a relatively small amount. Therefore, it may be difficult to detect the presence of a crack at an early stage when the turbine is running at normal speed under load.

Under the present invention, to promote a detectable vibration response at the earliest possible point in the creation of the crack, a perturbation is imposed on the crack to cause the incipient crack to appear momentarily larger than it actually is and to force the crack to behave in such a manner that an entirely different vibration response is imposed upon the turbine rotor. Preferably, in the case of actual or suspected surface cracks, the perturbation is imposed by lowering the temperature of the motive fluid, (e.g., the steam temperature) around the rotor by a very small amount while the turbine is operating at normal speed. In the case of a steam turbine, steam temperature is readily lowered via boiler superheat controls or by decreasing the power output of the boiler.

A temperature drop introduces transient thermal stresses in the rotor. A crack, if present in the region of the rotor which is exposed to steam, for example, causes an unbalance in the resultant axial forces over the cross section containing the crack. In addition, transient tensile stresses extending inward from the surface of the rotor open the crack, which was previously closed. As a consequence of this, for a short time two distinct but important changes take place in the rotor. First the rotor bows (bends) slightly, producing eccentricity and thus increasing the response due to unbalance at 1/rev. Second, because of the crack opening, an asymmetry is introduced in the rotor, which produces the 2/rev response. This permits detection of relatively shallow cracks since they are more likely to remain closed than deeper cracks but are nevertheless opened by the imposed temperature gradient. Further, since the crack remains opened during the complete revolution of the rotor, the appearance or increase of the 2/rev component, which is one indication of a crack, is quite dominant, making it possible to detect cracks at an early stage.

More specifically, the preferred technique is to (a) apply and maintain small temperature reductions to force open cracks that otherwise remain closed, then, (b) detect that the cracks exist via an analysis of the changes in the vibration signature, i.e., observing for a relatively large increase in 2/rev response along with increases in other harmonics of the vibration signals. Finally, (c) the approximate size of the crack can be determined by relating the amplitude of the transient vibration response of the rotor to the transient temperatures in the rotor. In maintaining the small temperature reduction, it is only necessary to do so until the maximum vibratory response is obtained. It is notable that this technique discriminates against other temperature induced vibratory responses so that the existence of a crack can be confidently called.

The advantage of using a small temperature drop is that the rotor is not subjected to high stresses that can cause a rapid growth of the crack which would appreciably shorten the subsequent life of the rotor. For example, the smaller the temperature drop, the lower the stresses, and the lower the rate of crack growth, until a threshold is reached below which no crack growth takes place. An additional advantage to using a small temperature drop is that the increase in vibration caused by opening the crack and stressing the rotor is small, so that damage to other components of the turbine does not occur.

The signal analysis, confirming that a crack causes the increase in vibration, is provided by decomposing at least one of the vibration signals into the turbine running speed (fundamental) and harmonics thereof (preferably up to about ten times the running speed). The characteristics of this signal analysis readily identifies whether a rotor crack is present. The essential characteristics are due to the harmonics contained in the rotor vibration produced by the crack as described previously. If the turbine rotor bearing system normally contains harmonics from causes unrelated to a crack, an additional step is to determine the rotor's particular vibration signature prior to lowering the temperature. This gives the existent, normal, or background harmonic content. The difference (between the background signature and the signature taken after the temperature drop) removes the existent harmonics and provides an indication that a crack is or is not present.

Figure 4A:
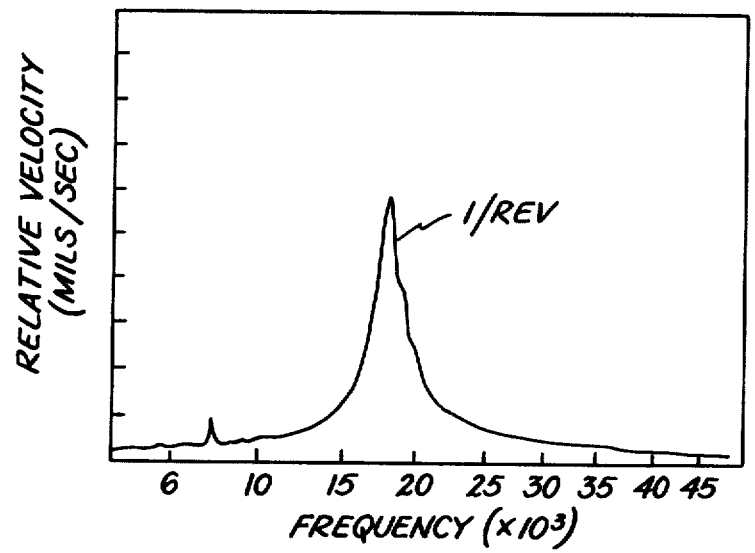
FIGS. 4(a) and 4(b) are illustrations of test data obtained using procedures according to the invention.
Figure 4B:
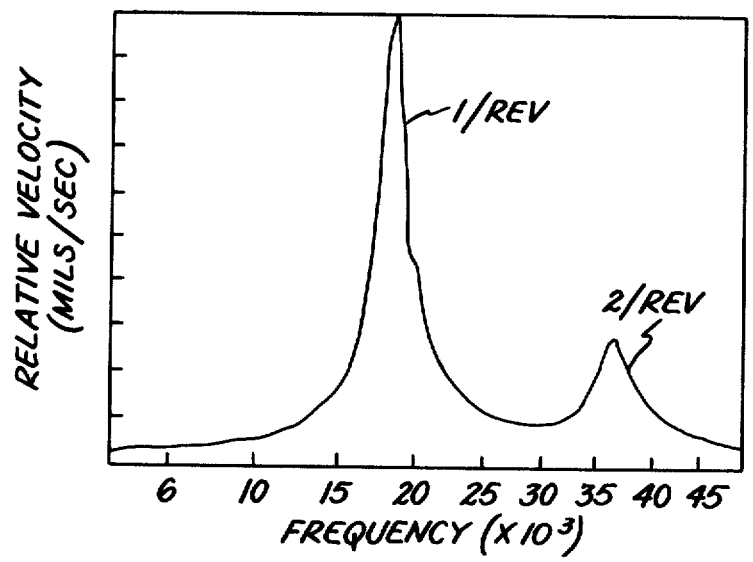

FIGS. 4(a) and 4(b) are illustrations of test data obtained from a turbine having a cracked rotor using the procedure set forth above. FIG. 4(a) illustrates the normal, background vibration response in the frequency domain; FIG. 4(b) illustrates the corresponding response following a perturbation of the turbine rotor by slightly lowering the temperature of the elastic motive fluid surrounding the rotor. Notable is the increased 1/rev response and the appearance of the 2/rev response. As the perturbation is removed and the turbine returned to steady state operation, the vibration response returns to that of FIG. 4(a).

The foregoing procedure wherein the turbine rotor is perturbed by transiently lowering the temperature is effective for the detection of outer surface cracks. In many turbines the rotor will include a bore (such as bore 52 of FIG. 1) which is also subject to being cracked. It is generally very difficult to detect bore cracks using vibration signature analysis since the majority of bore cracks are axial in orientation and have very little tendency to open and close during the rotation period. Thus the stiffness of the rotor remains uneffected with no significant effect on the vibration pattern. However, according to the present invention the rotor may be perturbed by imposing a momentary increase in the temperature of the motive fluid in a contact with the rotor outer surface to effect a corresponding change in the vibration pattern. By increasing the temperature, the surface expands, but the bore remains uneffected since it is not immediately responsive to changes in surface temperature, not being in direct contact with the motive fluid. The expansion of the surface pulls the cracked region apart thus opening the crack. An asymmetric stiffness of the rotor results which then produces a vibration signature indicative that a crack is present in the bore.

In another form of the invention, applicable to the detection of both outer surface cracks and bore cracks, the turbine rotor is perturbated by the application of a mechanical force applied externally to the turbine whose rotor is being tested. This is most conveniently carried out by using a mechanical shaker operating at different frequencies and applying the vibratory force to the bearing pedestals. For example, in FIG. 1 bearings 18, 20, 22, and 24 are supported upon pedestals (not specifically shown) external to the machine. The shaker, momentarily applies a vibratory force to the machine, and thereby creates a transient response in the turbine while it is running under load. The signature analysis in the transient phase contains the contributions of the various harmonics indicative of a crack in the manner described above wherein the rotor is perturbed by a temperature transient.

With further reference to FIG. 1, in addition to the vibration signals, acoustic emission information is taken into the microprocessor-based signal analyzer 38. This additional information is provided by acoustic emission sensors 46 and 48 located in proximity to, respectively, turbine rotor wheels 12 and 14; and by signal conditioner 50 which provides excitation, filtering, and amplification for the acoustic emission signals. Although shown near rotor wheels 12 and 14 for illustration purposes, it is preferable (to monitor the entire rotor) that the acoustic emission sensors be located immediately adjacent the rotor bearings. This has the advantage of not subjecting the sensors to the hostile environment within the turbine. Acoustic emissions are simply pressure wave emissions produced by a growing crack in any portion of rotor 10 and, in conjunction with the vibration signals analyzed as described above, confirm that a crack exists and is increasing in size. The acoustic emission signals are processed by signal analyzer 38 and may be displayed on recorder 42 and CRT display 40 concurrently with the vibration information or as an alternative thereto.

While the foregoing has described certain preferred forms of the invention, it will become apparent to those of ordinary skill in the art that variations may be made in the invention without departing from its true spirit and scope. It is intended to claim all such variations by the appended claims which follow.

The invention claimed is:

1. For a motive fluid powered turbine, a method for detecting incipient cracks in the turbine rotor while the turbine is under load at substantially normal operating speed, comprising the steps of:
    (a) obtaining from at least one vibration sensor, adapted to sense vibrations in said rotor, a signal representation of such vibrations;
    (b) determining the spectral distribution of said vibration signal;
    (c) causing a transient perturbation of said rotor to establish a transient vibratory response therein by changing the temperature of the turbine motive fluid;
    (d) determining the spectral distribution of said vibration signal resulting during said transient vibratory response, and
    (e) comparing the spectral distribution obtained in step (b) with the spectral distribution obtained in step (d), the change in spectral distribution between that of step (b) and that of step (d) being indicative of the presence and size of cracks in said rotor.

2. The method of claim 1 wherein said transient perturbation of the turbine rotor is established by increasing the temperature of the motive fluid.

3. The method of claim 1 wherein said transient perturbation of the turbine rotor is established by decreasing the temperature of the motive fluid.

4. The method of claim 1 wherein said at least one vibration sensor is located proximately to at least one journal bearing of the rotor.

5. The method of claim 1 wherein a pair of vibration sensors are located proximately to at least one journal bearing of the rotor, the vibration sensors of said pair being circumferentially separated around said bearing by substantially 90 degrees.

6. The method of claim 1 further including the steps of:
(f) obtaining from at least one acoustic emission sensor, adapted to sense acoustic emissions from said rotor, a signal representation of such emissions; and
(g) processing said acoustic emission signal in combination with the comparison of step (e) to confirm the presence of a crack in said rotor.

7. The method of claim 1 wherein steps (d) and (e) are continuously repeated to provide a substantially continuous indication.

8. A method for detecting cracks in the rotor of a steam turbine while the turbine is operating under load at substantially normal speed, comprising the steps of:
(a) sensing the mechanical vibrations in the rotor to produce a corresponding vibration signal;
(b) determining the harmonic content of the vibration signal;
(c) changing the steam temperature by a slight amount to effect a change in the physical response of existent rotor cracks and a corresponding change in the rotor vibration pattern;
(d) determining the harmonic content of the vibration signal immediately following step (c);
(e) comparing the harmonic content obtained in step (b) with that obtained in step (d), an increase in the amplitude of the fundamental and higher harmonics being indicative of the existence and size of cracks in the rotor.

9. The method of claim 8 wherein the steam temperature is increased.

10. The method of claim 8 wherein the steam temperature is decreased.

11. The method of claims 8, 9, or 10 wherein the mechanical vibrations are sensed at a plurality of rotor journal bearing locations and each corresponding signal is processed according to steps (a) through (e).

* * * * *